United States Patent
Jones et al.

(10) Patent No.: US 9,842,615 B1
(45) Date of Patent: Dec. 12, 2017

(54) MAGNETIC READER HAVING A NONMAGNETIC INSERTION LAYER FOR THE PINNING LAYER

(71) Applicant: Western Digital (Fremont), LLC, Fremont, CA (US)

(72) Inventors: Joshua Jones, Hoover, AL (US); Christian Kaiser, San Jose, CA (US); Yuankai Zheng, Fremont, CA (US); Qunwen Leng, Palo Alto, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/752,659

(22) Filed: Jun. 26, 2015

(51) Int. Cl.
*G11B 5/39* (2006.01)
*G11B 5/60* (2006.01)
*G11B 5/31* (2006.01)
*G11B 5/00* (2006.01)

(52) U.S. Cl.
CPC ........... *G11B 5/3912* (2013.01); *G11B 5/31* (2013.01); *G11B 5/3903* (2013.01); *G11B 5/3906* (2013.01); *G11B 5/3932* (2013.01); *G11B 5/6082* (2013.01); *G11B 2005/0008* (2013.01); *G11B 2005/3996* (2013.01)

(58) Field of Classification Search
CPC ....... G11B 5/39; G11B 5/3903; G11B 5/3906; G11B 2005/3996
USPC .................................................... 360/324.11
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |

(Continued)

*Primary Examiner* — Jefferson Evans
(74) *Attorney, Agent, or Firm* — Foley & Lardner LLP (57) ABSTRACT

A method and system provide a magnetic read apparatus. The magnetic read apparatus includes a read sensor. The read sensor includes a pinning layer, a nonmagnetic insertion layer and a pinned layer. The nonmagnetic insertion layer has a location selected from a first location and a second location. The first location is between the pinned layer and the pinning layer. The second location is within the pinning layer.

28 Claims, 5 Drawing Sheets

(56) References Cited

U.S. PATENT DOCUMENTS

| | | |
|---|---|---|
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |

(56) References Cited

U.S. PATENT DOCUMENTS

| | | |
|---|---|---|
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,266,012 B2 | 9/2007 | Saito et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,564,658 B2 | 7/2009 | Zhang et al. |
| 7,583,466 B2 | 9/2009 | Kermiche et al. |
| 7,583,481 B2 | 9/2009 | Zhang et al. |

(56) References Cited

U.S. PATENT DOCUMENTS

| | | |
|---|---|---|
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,973,349 B2 | 7/2011 | Huai et al. |
| 7,978,439 B2 | 7/2011 | Zhang et al. |
| 7,982,989 B1 | 7/2011 | Shi et al. |
| 8,008,912 B1 | 8/2011 | Shang |
| 8,012,316 B2 | 9/2011 | Zhang et al. |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,339,754 B2 | 12/2012 | Zhang et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,379,351 B2 * | 2/2013 | Fuji .................. B82Y 10/00 360/324.1 |
| 8,381,391 B2 | 2/2013 | Park et al. |
| 8,385,027 B2 | 2/2013 | Zhao et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |

(56) References Cited

U.S. PATENT DOCUMENTS

| | | |
|---|---|---|
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,570,691 B2 * | 10/2013 | Sato .................. G11B 5/3909 360/324.11 |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,316 B2 * | 3/2014 | Lee .................. B82Y 10/00 360/324.11 |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,755,152 B1 * | 6/2014 | Park .................. G01R 33/093 360/319 |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 9,121,886 B2 * | 9/2015 | Singleton .................. G01R 33/09 |
| 2002/0131215 A1 * | 9/2002 | Beach .................. B82Y 10/00 360/324.2 |
| 2003/0168673 A1 * | 9/2003 | Yuasa .................. B82Y 10/00 257/200 |
| 2006/0061915 A1 * | 3/2006 | Zhang .................. B82Y 10/00 360/324.11 |
| 2007/0076331 A1 * | 4/2007 | Pinarbasi .................. B82Y 10/00 360/324.11 |
| 2008/0316657 A1 * | 12/2008 | Zhang .................. B82Y 10/00 360/324.11 |
| 2009/0168270 A1 * | 7/2009 | Takahashi .................. B82Y 25/00 360/324.11 |
| 2009/0213503 A1 * | 8/2009 | Sun .................. B82Y 10/00 360/324.2 |
| 2009/0257152 A1 * | 10/2009 | Lee .................. B82Y 10/00 360/324.11 |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0257298 A1 * | 10/2012 | Sato .................. G11B 5/3909 360/75 |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

(56) References Cited

U.S. PATENT DOCUMENTS

| | | | | |
|---|---|---|---|---|
| 2014/0334032 | A1* | 11/2014 | Nishioka | G11B 5/127 360/75 |
| 2015/0332714 | A1* | 11/2015 | Singleton | G01R 33/09 360/319 |
| 2016/0197146 | A1* | 7/2016 | Augusto | H01L 29/68 257/22 |

* cited by examiner

ABS View
FIG. 2B

MAGNETIC READER HAVING A NONMAGNETIC INSERTION LAYER FOR THE PINNING LAYER

BACKGROUND

Figure 1:
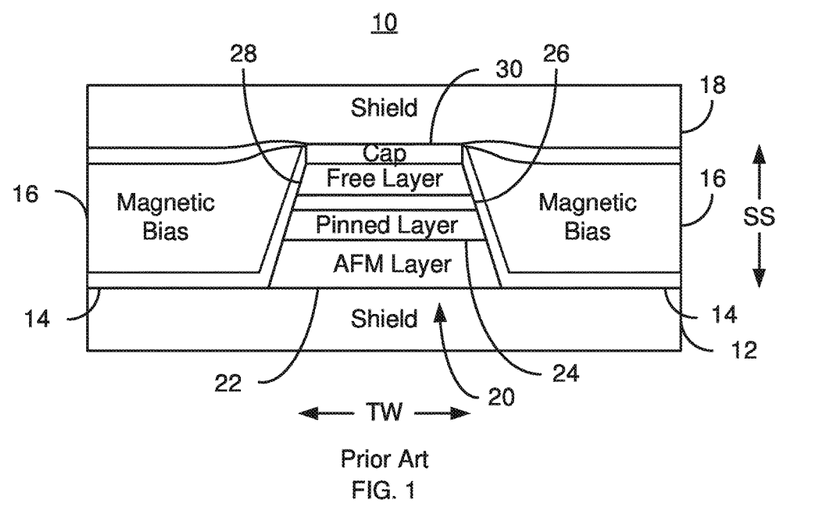
FIG. 1 depicts an ABS view of a conventional magnetic recording read transducer.

FIG. 1 depicts an air-bearing surface (ABS) view of a conventional read transducer used in magnetic recording technology applications. The conventional read transducer 10 includes shields 12 and 18, insulator 14, magnetic bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. If the sensor 20 is to be used in a current perpendicular to plane (CPP) configuration, then current is driven in a direction substantially perpendicular to the plane of the layers 22, 24, 26, and 28. Conversely, in a current-in-plane (CIP) configuration, then conductive leads (not shown) would be provided on the magnetic bias structures 16. The magnetic bias structures 16 are used to magnetically bias the free layer 28. The pinned layer 26 adjoins, or shares an interface, with the AFM layer 22. This allows for the pinned layer 26 magnetic moment to be exchange coupled with the magnetic moments AFM layer 22. Consequently, the pinned layer magnetic moment is fixed, or pinned, using the AFM layer 22.

Although the conventional transducer 10 functions, there are drawbacks. In particular, the read sensor 20 may be subject to noise. For example, there may be instabilities in the orientation of the pinned layer magnetic moment with respect to the free layer magnetic moment. The conventional read sensor 20 may not thus adequately read high density media.

DETAILED DESCRIPTION OF THE PREFERRED EMBODIMENTS

Figure 2A:
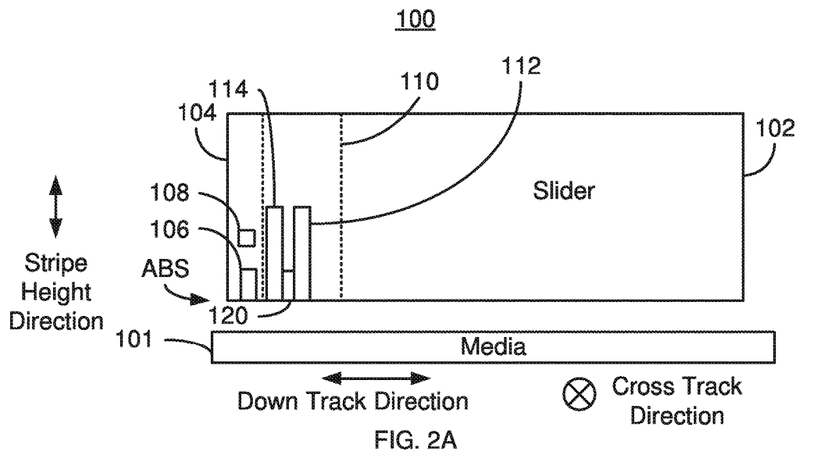
FIGS. 2A-2B depict side and ABS views of an exemplary embodiment of a portion of a magnetic read apparatus.
Figure 2B:
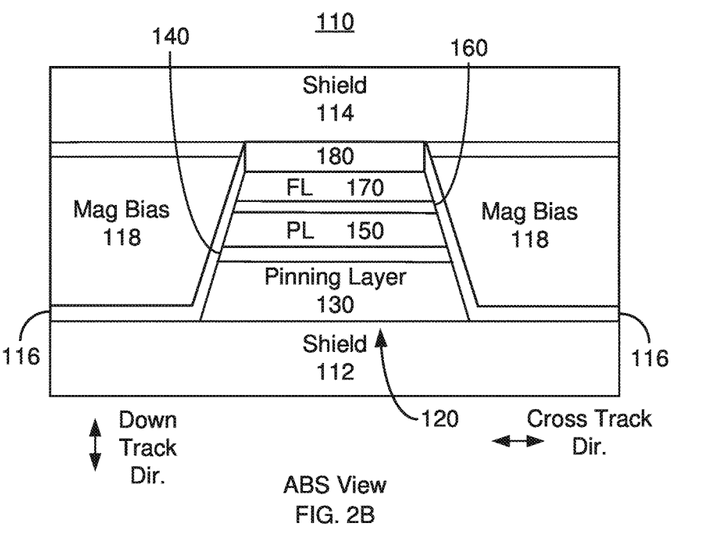

FIGS. 2A-2B depict side and ABS views of an exemplary embodiment of a portion of a magnetic recording apparatus 100. For clarity, FIGS. 2A-2B are not to scale. Further, only a portion of the components of the magnetic apparatus 100 are depicted. The magnetic recording apparatus 100 depicted is a disk drive including media 101 and a slider 102 having a writer 104 and a read transducer 110 fabricated thereon. The write transducer 104 includes at least a write pole 106 and coil(s) 108 for energizing the pole 106. The write transducer 104 may be a perpendicular magnetic recording (PMR) writer, a heat assisted magnetic recording (HAMR) writer or another writer. In other embodiments, the write transducer 104 might be omitted.

The read transducer 110 includes a read sensor 120 and may include soft magnetic shields 112 and 114. The shields 112 and 114 may be formed of NiFe or another soft magnetic material. The read transducer 110 may also include insulating layer 116 and magnetic bias structures 118. The insulating layer 116 separates the magnetic bias structures 118 from the read sensor 120 and, in the embodiment shown, from the shield 112. The magnetic bias structures 118 may be soft magnetic bias structures, hard magnetic bias structures and/or other magnetic bias structures. In other embodiments, other structures may be included and/or structures 112, 114, 116 and/or 118 may be omitted.

The read sensor 120 includes at least a pinning layer 130, a nonmagnetic insertion layer 140 and a pinned layer 150. In the embodiment shown, the read sensor 120 also includes a nonmagnetic spacer layer 160 and a free layer 170. The nonmagnetic spacer layer may be a conductor, such as Cu, or an insulating tunneling barrier layer, such as crystalline MgO. Thus, the sensor 120 may be a GMR sensor or a TMR sensor.

The pinning layer 130 is used to fix, or pin, the magnetic moment of the pinned layer 150. The pinning layer 130 may thus be an antiferromagnetic (AFM) layer 130. For example, the pinning layer 130 might be an IrMn layer, a PtMn layer, an FeMn layer or an analogous structure. The pinned layer 150 is ferromagnetic and may include sublayers that are magnetic and/or nonmagnetic. Note that in some embodiments, a nonmagnetic layer (not shown) and a ferromagnetic layer (not shown) may be between the pinned layer 150 and the nonmagnetic spacer layer 160. In some such embodiments, the magnetic moments of the pinned layer 150 and the additional ferromagnetic layer may be antiferromagnetically coupled through the nonmagnetic layer. Thus, the pinned layer 150 may be part of a structure such as a synthetic antiferromagnetic (SAF) structure.

The nonmagnetic insertion layer 140 has a location selected from a first location and a second location. The first location, shown in the embodiment depicted in FIG. 2B, is between the pinning layer 130 and the pinned layer 150. In some embodiments, the nonmagnetic insertion layer 140 adjoins both the pinning layer 130 and the pinned layer 150. Thus, the nonmagnetic insertion layer 140 may share one interface with the pinning layer 130 and the opposite interface with the pinned layer 150. The second location is within the pinning layer 130. In an alternate embodiment, multiple nonmagnetic insertion layers could be included. In such an embodiment, one insertion layer would be in the first location (between the layers 130 and 150) and another insertion layer would be in the second location (within the layer 150). In some embodiments, the nonmagnetic insertion layer 140 includes at least one of Ag, Mg, Mn, Ir, Pt, Cr, Ti, Si, C, Al, Ru and Au. In some such embodiments, the nonmagnetic insertion layer 140 consists of Ag, Mg, Mn, Ir, Pt, Cr, Ti, Si, C, Al, Ru and/or Au. The nonmagnetic insertion layer 140 may also be desired to be thin. In some embodiments, therefore, the thickness of the nonmagnetic insertion layer 140 may be at least one Angstrom and not more than five Angstroms in some embodiments. For example, the thickness of the nonmagnetic insertion layer 140 may be at least one Angstroms and not more than three Angstroms. The nonmagnetic insertion layer 140 may thus be a dusting layer. In some embodiments, the nonmagnetic insertion layer 140 may be discontinuous.

Figure 3A:
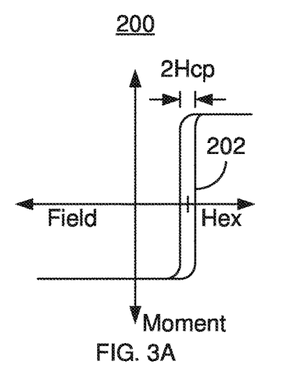
FIG. 3A-3B are graphs depicting the magnetic moment versus field and the ratio of the exchange field to the coercivity of the pinned layer versus thickness of the magnetic insertion layer.
Figure 3B:
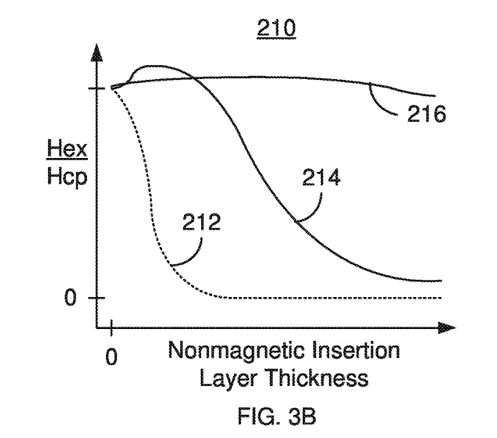

The nonmagnetic insertion layer 140 is configured to affect the magnetic coupling between the pinning layer 130 and the pinned layer 150. This effect may be seen in FIGS. 3A-3B. FIGS. 3A and 3B are graphs 200 and 210, respectively, depicting the magnetic moment versus field for the pinned layer 150 and the ratio of the exchange field to the coercivity versus the thickness of the insertion layer 140. FIGS. 3A-3B are not to scale and are for explanatory purposes only. Thus, actual data is not meant to be represented in the graphs 200 and 210.

As can be seen in FIG. 3A, the magnetic moment of the pinned layer 150 exhibits a hysteresis loop 202 with respect to magnetic field. The hysteresis loop 202 is shifted from being centered at a zero applied magnetic field because of the magnetic coupling between the pinning layer 130 and the pinned layer 150. The shift in the center of the hysteresis loop is the exchange field, Hex, due to the coupling between the pinning layer 130 and the pinned layer 150. The coercivity, Hcp, relates to the applied field which will cause the magnetic moment of the pinned layer 150 to go to zero as part of a transition from a positive moment to a negative moment or vice versa. Because the hysteresis loop is shifted, the coercivity is based on the width of the loop (2*Hcp=width of loop). The coercivity is a measure of the fraction of unstable grains in the pinning layer 130.

The ratio of the exchange field to the coercivity (Hex/Hcp) may be considered both a measure of the strength and stability of the magnetic coupling between the pinning layer 130 and the pinned layer 150 and a measure of the fraction of unstable grains in the pinning layer 130. As can be seen in the graph 210 of FIG. 3B, the use of the nonmagnetic insertion layer 140 changes this ratio. Curves 212, 214 and 216 depict the ratio Hex/Hcp versus insertion layer thickness for various materials. Note that a zero thickness for the nonmagnetic insertion layer 140 means that no nonmagnetic insertion material is present. Thus, the curves 212, 214 and 216 meet at a zero insertion layer thickness. Curve 212 is the generally expected result of adding the nonmagnetic insertion layer 140, particularly between the pinned layer 150 and the pinning layer 130. For the material corresponding to the curve 212, the presence of any nonmagnetic material reduces the exchange coupling. Such a curve is typical for the insertion of a nonmagnetic material between the layers 130 and 150. Thus, for most materials, the relationship between insertion layer thickness and Hex/Hcp would follow the curve 212. Curves 214 and 216, in contrast, indicate that the ratio of Hex to Hcp may actually increase for small thicknesses of certain materials. For some such materials, the exchange field may increase for small thicknesses (e.g. less than ten Angstroms) while the coercivity decreases or remains constant. Alternatively, the coercivity may decrease and the exchange field may be constant for the small thicknesses. Other combinations of possibilities result in a maximum in Hex/Hcp that occurs at a nonzero thickness of the nonmagnetic insertion layer 140. Thus, for appropriate selection of materials and location, Hex/Hcp increases or remains constant for nonzero insertion layer thicknesses. Materials such as Ag, Mg, Mn, Ir, Pt, Cr, Ti, Si, C, Al, Ru and/or Au used as the insertion layer allow for an increase (or constant) Hex/Hcp for the pinned layer 150 and pinning layer 130 at small thicknesses of nonmagnetic insertion layer. For larger thicknesses of the nonmagnetic insertion layer 140, the magnetic coupling between the layers 130 and 150 decreases. Thus, the nonmagnetic insertion layer 140 is configured such that the Hex/Hcp for the pinned layer 150 has a maximum for a nonzero thickness of the insertion layer 140. Stated differently, the nonmagnetic insertion layer 140 is configured such that Hex/Hcp increases or remains constant for some small thicknesses of the nonmagnetic insertion layer 140.

It is believed that the nonmagnetic insertion layer 140 operates in the following manner. However, the benefits and use of the magnetic devices described herein are independent of a particular physical mechanism. Because the nonmagnetic insertion layer 140 is thin and may be made of particular materials, it is believed that the materials in the nonmagnetic insertion layer 140 migrate to the grain boundaries of the grains of the pinning layer 140 during fabrication. Thus, although depicted as a single layer, the nonmagnetic insertion layer 140 may be discontinuous or reside only in certain areas (e.g. grain boundaries at and near the interface of the pinning layer 130. The presence of the nonmagnetic insertion layer 140 at the grain boundaries of smaller, less stable grains may decouple these grains from the pinned layer 150. Thus, if the magnetic moment of the pinned layer 150 switches direction, the less stable grains of the pinning layer 130 may be less likely to change direction. Thus, these less stable grains are thus less likely to provide a magnetic bias in a direction opposite to the desired direction of magnetization. The pinned layer 150 magnetic moment may more readily return to the desired direction. The coercivity of the pinned layer 150 may thus be reduced. The stability of the magnetic moment of the pinned layer 150 may be enhanced. Stated differently, the coupling between the pinning layer 130 and the pinned layer 150 that pins the magnetic moment of the pinned layer 150 in the desired direction may be improved.

Regardless of the physical mechanism, the ratio of the exchange field and the coercivity may be improved. Consequently, the stability of the coupling between the pinned layer 150 and the pinning layer 130 may be enhanced. Noise due to instabilities in the magnetic moment of the pinned layer 130 may thus be removed. Performance of the magnetic device may thereby be improved.

Figure 4:
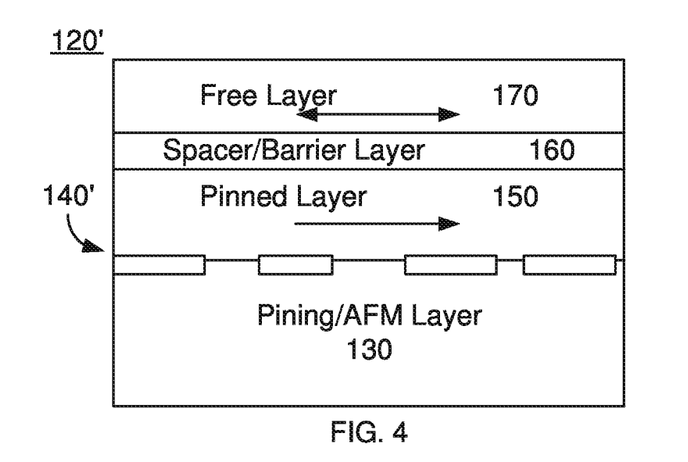
FIG. 4 depicts another exemplary embodiment of a portion of a magnetic read sensor.

FIG. 4 depicts another embodiment of a magnetic read sensor 120'. For clarity, FIG. 4 is not to scale. The read sensor 120' may be part of a read transducer and/or magnetic recording apparatus such as the read transducer 110 and magnetic recording apparatus 100. The transducer of which the read sensor 120' may be a part is part of a disk drive having a media, a slider and the head coupled with the slider. The read sensor 120' corresponds to the read sensor 120. Consequently, analogous components are labeled similarly. For example, the read sensor 120' includes a pinning/AFM layer 130, a nonmagnetic insertion layer 140', a pinned layer 150, a nonmagnetic spacer or tunneling barrier layer 160 and a free layer 170 that are analogous to the a pinning/AFM layer 130, the nonmagnetic insertion layer 140, the pinned layer 150, the nonmagnetic spacer or tunneling barrier layer 160 and the free layer 170 that are part of the read sensor 120 and thus part of the magnetic recording apparatus 100. Thus, the components 120', 130, 140', 150, 160 and 170 have a similar structure and function to the components 120, 130, 140, 150, 160 and 170, respectively, depicted in FIGS. 2A-2B. Thus, the nonmagnetic insertion layer 140' is configured such that Hex/Hcp increases or remains constant for some small thicknesses of the nonmagnetic insertion layer 140'. In some embodiments, the nonmagnetic insertion layer 140' includes at least one of Ag, Mg, Mn, Ir, Pt, Cr, Ti, Si, C, Al, Ru and Au. In some embodiments, the nonmagnetic insertion layer 140' consists of Ag, Mg, Mn, Ir, Pt, Cr, Ti, Si, C, Al, Ru and/or Au. The nonmagnetic insertion layer 140' may also be desired to be thin. The nonmagnetic insertion layer 140' may have a thickness of not more than five Angstroms. In some such embodiments, the thickness of the nonmagnetic insertion layer 140' may be not more than three Angstroms. The nonmagnetic insertion layer 140' may also have a thickness of at least one Angstrom.

In the embodiment shown in FIG. 4, the nonmagnetic insertion layer 140' is explicitly discontinuous. In some embodiments, the nonmagnetic insertion layer 140' at least one Angstrom thick. Other thicknesses are, however, possible. In the embodiment shown, the nonmagnetic insertion layer 140' is in the first location: between the pinned layer 150 and the pinning layer 130. Also in the embodiment shown, the nonmagnetic insertion layer 140' shares interfaces with the pinning layer 130 and an opposite interface with the pinned layer 150. Note that in some embodiments, the nonmagnetic insertion layer 140' may reside at the grain boundaries of the pinning layer 130. Thus, the top surface of the nonmagnetic insertion layer 140' may be substantially coplanar with the top surface of the pinning layer 130. The nonmagnetic insertion layer 140' is, however, still considered to be at the first location: between the pinned layer 150 and the pinning layer 130. In another embodiment, the nonmagnetic insertion layer 140' might be located within the pinning layer 130.

The read sensor 120' shares the benefits of the read sensor 120. The use of the nonmagnetic insertion layer 140' may allow for a maximum in the Hex/Hcp for nonzero thicknesses of the nonmagnetic insertion layer 140'. Thus, the coupling between the pinning layer 130 and pinned layer 150 may be improved. The improved stability in the coupling between the pinned layer 150 and the pinning layer 130 may reduce noise during operation of the read sensor 120'.

Figure 5:
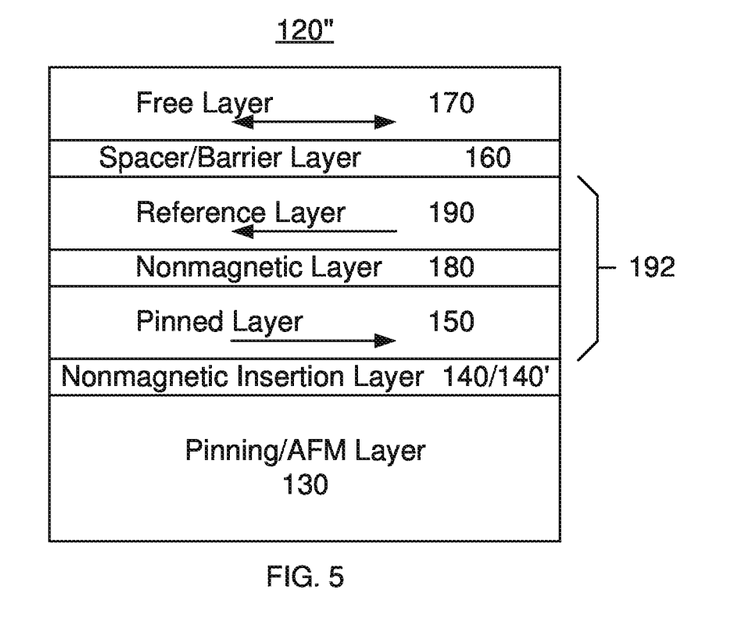
FIG. 5 depicts another exemplary embodiment of a portion of a magnetic read sensor.

FIG. 5 depicts another embodiment of a magnetic read sensor 120". For clarity, FIG. 5 is not to scale. The read sensor 120" may be part of a read transducer and/or magnetic recording apparatus such as the read transducer 110 and magnetic recording apparatus 100. The transducer of which the read sensor 120" may be a part is part of a disk drive having a media, a slider and the head coupled with the slider. The read sensor 120" corresponds to the read sensor(s) 120 and/or 120'. Consequently, analogous components are labeled similarly. For example, the read sensor 120" includes a pinning/AFM layer 130, a nonmagnetic insertion layer 140/140', a pinned layer 150, a nonmagnetic spacer or tunneling barrier layer 160 and a free layer 170 that are analogous to the a pinning/AFM layer 130, the nonmagnetic insertion layer 140/140', the pinned layer 150, the nonmagnetic spacer or tunneling barrier layer 160 and the free layer 170 that are part of the read sensor 120 and thus part of the magnetic recording apparatus 100. Thus, the components 120', 130, 140/140', 150, 160 and 170 have a similar structure and function to the components 120, 130, 140/140', 150, 160 and 170, respectively, depicted in FIGS. 2A-2B and 4. Thus, the nonmagnetic insertion layer 140/140' is configured such that Hex/Hcp increases or remains constant for some small thicknesses of the nonmagnetic insertion layer 140/140'. In some embodiments, the nonmagnetic insertion layer 140/140' includes at least one of Ag, Mg, Mn, Ir, Pt, Cr, Ti, Si, C, Al, Ru and Au. In some such embodiments, the nonmagnetic insertion layer 140/140' consists of Ag, Mg, Mn, Ir, Pt, Cr, Ti, Si, C, Al, Ru and/or Au. The nonmagnetic insertion layer 140/140' may also be desired to be thin. The nonmagnetic insertion layer 140/140' may have a thickness of not more than five Angstroms. In some such embodiments, the thickness of the nonmagnetic insertion layer 140/140' may be not more than three Angstroms. The nonmagnetic insertion layer 140/140' may also have a thickness of at least one Angstrom.

In the embodiment shown in FIG. 5, the read sensor 120" includes a nonmagnetic layer 180 and a reference layer 190. The nonmagnetic layer 180 is conductive and may include a material such as Ru. The reference layer 190 is ferromagnetic and may include sublayers. The reference layer 190 and the pinned layer 150 are coupled through the nonmagnetic layer 180. For example, the coupling may be an RKKY coupling. Thus, the layers 150, 180 and 190 form a synthetic antiferromagnet (SAF).

The read sensor 120" shares the benefits of the read sensor(s) 120/120'. The use of the nonmagnetic insertion layer 140/140' may allow for a maximum in the Hex/Hcp for nonzero thicknesses of the nonmagnetic insertion layer 140/140'. Thus, the coupling between the pinning layer 130 and pinned layer 150 may be improved. The improved stability in the coupling between the pinned layer 150 and the pinning layer 130 may reduce noise during operation of the read sensor 120".

Figure 6:
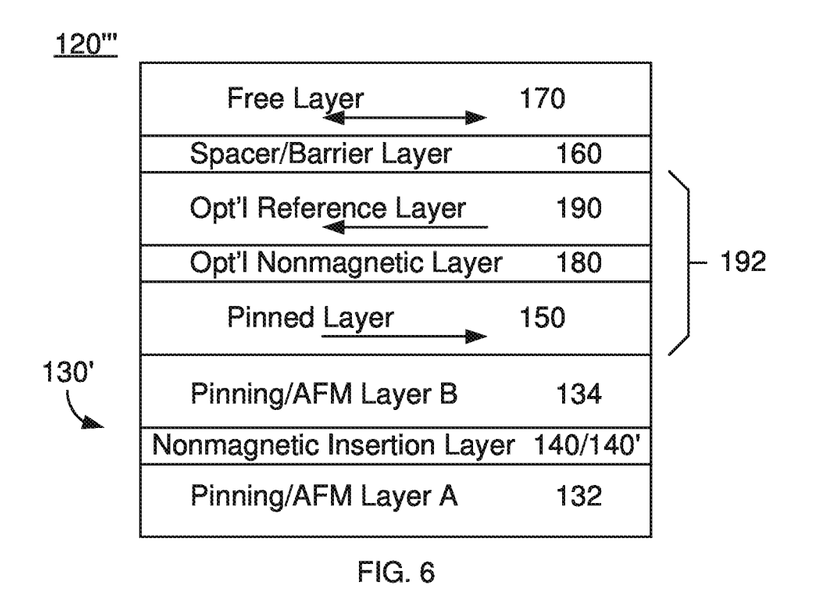
FIG. 6 depicts another exemplary embodiment of a portion of a magnetic read sensor.

FIG. 6 depicts another embodiment of a magnetic read sensor 120"'. For clarity, FIG. 6 is not to scale. The read sensor 120"' may be part of a read transducer and/or magnetic recording apparatus such as the read transducer 110 and magnetic recording apparatus 100. The transducer of which the read sensor 120"' may be a part is part of a disk drive having a media, a slider and the head coupled with the slider. The read sensor 120"' corresponds to the read sensor(s) 120, 120' and/or 120". Consequently, analogous components are labeled similarly. For example, the read sensor 120"' includes a pinning/AFM layer 130', a nonmagnetic insertion layer 140/140', a pinned layer 150, a nonmagnetic spacer or tunneling barrier layer 160 and a free layer 170 that are analogous to the a pinning/AFM layer 130, the nonmagnetic insertion layer 140/140', the pinned layer 150, the nonmagnetic spacer or tunneling barrier layer 160 and the free layer 170 that are part of the read sensor 120 and thus part of the magnetic recording apparatus 100. The read sensor 120"' also may include optional reference layer 190 and optional nonmagnetic layer 180. The pinned layer 150', optional nonmagnetic spacer layer 180 and optional reference layer 190' may form an optional SAF 192.

Thus, the components 120"', 130', 140/140', 150, 160, 170, 180, and 170 have a similar structure and function to the components 120/120'/120", 130, 140/140', 150, 160 and 170, respectively, depicted in FIGS. 2A-2B and 4. Thus, the nonmagnetic insertion layer 140/140' is configured such that Hex/Hcp increases or remains constant for some small thicknesses of the nonmagnetic insertion layer 140/140'. In some embodiments, the nonmagnetic insertion layer 140/140' includes at least one of Ag, Mg, Mn, Ir, Pt, Cr, Ti, Si, C, Al, Ru and Au. In some such embodiments, the nonmagnetic insertion layer 140/140' consists of Ag, Mg, Mn, Ir, Pt, Cr, Ti, Si, C, Al, Ru and/or Au. The nonmagnetic insertion layer 140/140' may also be desired to be thin. The nonmagnetic insertion layer 140/140' may have a thickness of not more than five Angstroms. In some such embodiments, the thickness of the nonmagnetic insertion layer 140/140' may be not more than three Angstroms. The nonmagnetic insertion layer 140/140' may also have a thickness of at least one Angstrom.

In the embodiment shown in FIG. 6, the nonmagnetic insertion layer 140/140' is explicitly within the pinning layer 130'. Thus the pinning layer 130' includes a pinning layer A 132 and a pinning layer 134 between which is the nonmagnetic insertion layer 140/140'. Although depicted as midway through the pinning layer 130', the nonmagnetic insertion layer 140/140' may reside elsewhere. For example, the nonmagnetic insertion layer 140/140' may be closer to the interface between the layers 130' and 150' than to the bottom surface of the pinning layer 130'. Further, even if the nonmagnetic insertion layer 140/140' is deposited in the middle of the AFM layer 130' as shown, the nonmagnetic insertion layer 140/140' may migrate during fabrication of the read sensor 120'''. Thus, the nonmagnetic insertion layer 140/140' may be closer to the pinned layer 150 and may or may not be continuous.

The read sensor 120''' shares the benefits of the read sensor(s) 120/120'/120'. The use of the nonmagnetic insertion layer 140/140' may allow for a maximum in the Hex/Hcp for nonzero thicknesses of the nonmagnetic insertion layer 140/140'. Thus, the coupling between the pinning layer 130' and pinned layer 150 may be improved. The improved stability in the coupling between the pinned layer 150 and the pinning layer 130' may reduce noise during operation of the read sensor 120''.

The read sensors 120, 120', 120" and 120''' have been shown in various configurations to highlight particular features, such as differences in geometries. One of ordinary skill in the art will readily recognize that two or more of these features may be combined in various manners consistent with the method and system described herein that are not explicitly depicted in the drawings.

Figure 7:
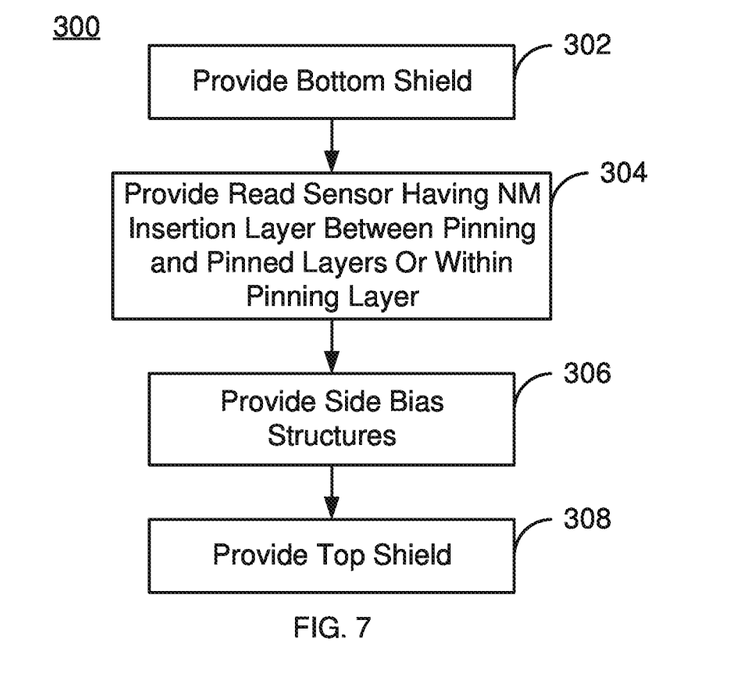
FIG. 7 is flow chart depicting an exemplary embodiment of a method for providing a magnetic recording read apparatus.

FIG. 7 is an exemplary embodiment of a method 300 for providing a read transducer. For simplicity, some steps may be omitted, interleaved, combined, have multiple substeps and/or performed in another order unless otherwise specified. The method 300 is described in the context of providing a magnetic recording apparatus 100, transducer 110 and read sensor 100. However, the method 300 may be used in fabricating the read sensor 120, 120', 120" and/or 120". The method 300 may be used to fabricate multiple magnetic read heads at substantially the same time. The method 300 may also be used to fabricate other magnetic recording transducers. The method 300 is also described in the context of particular layers. A particular layer may include multiple materials and/or multiple sub-layers. The method 300 is described in the context of a disk drive. However, the method may be used in other applications employing a magnetoresistive and bias structures. The method 300 also may start after formation of other portions of the magnetic recording transducer.

The bottom shield 112 is provided, via step 302. Step 302 may include depositing a magnetic material, such as NiFe and patterning the shield.

The read sensor 120 is provided, via step 304. Step 304 may include depositing a stack of layers for the read sensor 120 and defining the read sensor in the cross-track and stripe height directions. Further, the nonmagnetic insertion layer 140 is provided in the first or second location. Thus, the nonmagnetic insertion layer 140 may be placed between the pinned layer 150 and the pinning layer 140 or may be placed within the AFM. Thus, the read sensor 120, 120', 120" or 120''' may be provided.

The side bias structures 118 are provided, via step 306. Step 306 is performed after the read sensor 120 is defined in the cross-track direction. Thus, at least part of step 304 is performed before step 306. Step 306 may include depositing the insulating layer 116, depositing the material(s) for the magnetic bias structures 118 and depositing a top nonmagnetic layer. A mill step and planarization, such as a chemical mechanical planarization (CMP) may also be performed.

The top shield 114 is provided, via step 308. Step 208 may include depositing, planarizing and patterning soft magnetic layer, such as a NiFe layer.

Using the method 300, the transducer 110 and the read sensor 120, 120', 120" and/or 120''' may be fabricated. Thus, the benefits of one or more of the read sensor 120, 120', 120" and/or 120''' may be achieved. Consequently, performance of the magnetic recording apparatus may be improved.

Figure 8:
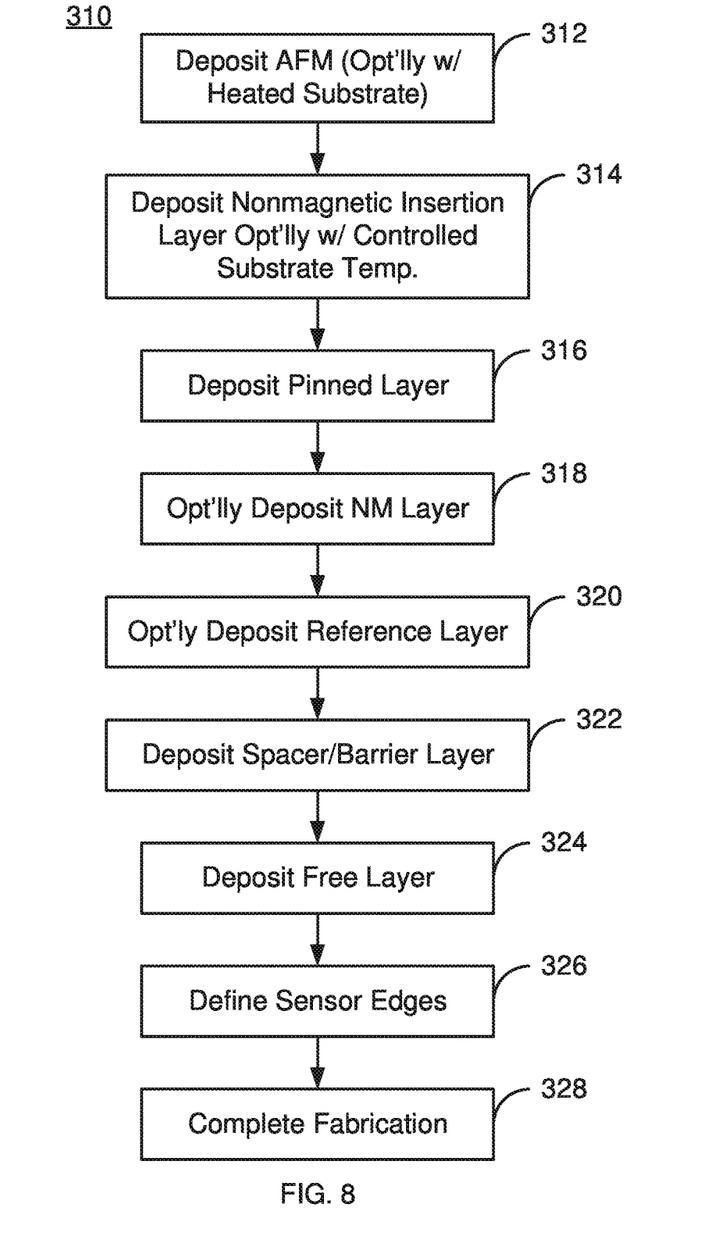
FIG. 8 is flow chart depicting another exemplary embodiment of a method for providing a magnetic recording read transducer.

FIG. 8 is an exemplary embodiment of a method 310 for providing a read sensor such as the read sensor 120, 120', 120" and/or 120'''. For simplicity, some steps may be omitted, interleaved, combined, have multiple substeps and/or performed in another order unless otherwise specified. The method 310 is described in the context of providing a magnetic recording disk drive 100 and transducer 110. However, the method 310 may be used in fabricating another magnetic recording device. The method 310 may be used to fabricate multiple magnetic read sensors at substantially the same time. The method 310 is also described in the context of particular layers. A particular layer may include multiple materials and/or multiple sub-layers.

The pinning layer 130/130' is deposited, via step 312. Step 312 may include heating the substrate such that the materials for the pinning layer are deposited above the ambient temperature. For example, the IrMn or other AFM used for the pinning layer 130/130' may be deposited above room temperature.

The nonmagnetic insertion layer 140/140' is provided via step 314. Step 314 may include controlling the temperature of the substrate. Thus, the substrate may be heated such that the material(s) for the nonmagnetic insertion layer are deposited at a temperature above the ambient temperature. For example, the nonmagnetic insertion layer 140/140' may be sputtered above room temperature. In such embodiments, the atoms for the nonmagnetic insertion layer 140/140' may be more mobile. These atoms may more readily migrate, for example to grain boundaries of the pinning layer 130/130'. In other embodiments, step 314 may include cooling the substrate such that the nonmagnetic insertion layer 140/140' is deposited at temperatures below the ambient temperature. For example, the substrate may be cooled (e.g. via water cooling, liquid nitrogen cooling or physical connection to another heat sink) below the ambient temperature during deposition. For example, the material(s) for the nonmagnetic insertion layer 140/140' may be sputtered below room temperature. In such embodiments, the atoms for the nonmagnetic insertion layer may be less likely to migrate. In other embodiments, no attempt may be made to control the temperature of the substrate during deposition. Further, if the pinning layer 130' is used, then steps 312 and 314 are interleaved such that the nonmagnetic insertion layer 140/140' is deposited within the pinning layer 130'.

The pinned layer 150 is deposited, via step 316. Step 316 may include depositing multiple ferromagnetic layers. Nonmagnetic layer(s) may also be provided within the pinned layer. In some embodiments, the nonmagnetic layer 180 and reference layer 190 are deposited in steps 320 and 322, respectively.

The nonmagnetic spacer layer 160 is deposited, via step 322. For example, a conductive layer or tunneling barrier layer may be provided in step 322. The free layer 170 is deposited, via step 324. Step 324 may include depositing multiple ferromagnetic layers. Nonmagnetic layer(s) may also be provided within the free layer 170.

The edges of the read sensor 120, 120', 120" and/or 120''' are defined, via step 324. Step 324 may include providing a mask on the read sensor stack deposited in the previous steps and ion milling the exposed regions. The read sensor 120, 120', 120" and/or 120''' may be defined in the cross-track and stripe height (perpendicular to the ABS) directions. Fabrication of the read sensor may then be completed. For example, anneals, capping layer depositing, and/or other processing steps may be performed.

Using the method 310, the read sensor(s) 120, 120', 120" and/or 120''' may be fabricated. Thus, the benefits of one or more of the read sensor(s) 120, 120', 120" and/or 120''' may be achieved.

We claim:

1. A magnetic apparatus comprising:
   an element comprising a pinning layer, a nonmagnetic insertion layer, and a pinned layer, a location of the nonmagnetic insertion layer selected from a first location between the pinned layer and the pinning layer and a second location within the pinning layer,
   wherein, in the first location, a top surface of the nonmagnetic insertion layer is substantially coplanar with a top surface of the pinning layer, and wherein the nonmagnetic insertion layer adjoins the pinned layer and the pinning layer, the pinning layer being an antiferromagnetic (AFM) layer.

2. The magnetic apparatus of claim 1 wherein the element further comprises a nonmagnetic spacer layer and a free layer, the nonmagnetic spacer layer residing between the free layer and the pinned layer, the pinned layer being between the free layer and the pinning layer such that the free layer, the nonmagnetic spacer layer, the pinned layer and the pinning layer form a stack.

3. The magnetic apparatus of claim 1 wherein the nonmagnetic insertion layer comprises at least one of Ag, Mg, Mn, Ir, Pt, Cr, Ti, Si, C, Al, Ru and Au.

4. The magnetic apparatus of claim 1 wherein the nonmagnetic insertion layer has a thickness of not more than five Angstroms.

5. The magnetic apparatus of claim 4 wherein the nonmagnetic insertion layer has the thickness of not more than three Angstroms.

6. The magnetic apparatus of claim 4 wherein the nonmagnetic insertion layer has the thickness of at least one Angstrom.

7. The magnetic apparatus of claim 1 further comprising:
   a bottom shield;
   a top shield, the element residing between the bottom shield and the top shield; and
   a side bias structure adjacent to at least one side surface of the element.

8. The magnetic apparatus of claim 1 wherein the nonmagnetic insertion layer is at the first location.

9. The magnetic apparatus of claim 8 wherein the nonmagnetic insertion layer adjoins the pinning layer and the pinned layer adjoins the nonmagnetic insertion layer.

10. The magnetic apparatus of claim 1 wherein the nonmagnetic insertion layer is configured such that a ratio of an exchange field to a coercivity for the pinned layer has a maximum at a nonzero thickness of the nonmagnetic insertion layer.

11. The magnetic apparatus of claim 1 wherein the nonmagnetic insertion layer excludes Mg and Al.

12. A magnetic apparatus comprising:
    an element comprising a pinning layer, a nonmagnetic insertion layer, and a pinned layer, a location of the nonmagnetic insertion layer selected from a first location between the pinned layer and the pinning layer and a second location within the pinning layer,
    wherein the nonmagnetic insertion layer is a discontinuous layer.

13. A magnetic apparatus comprising:
    an element comprising a pinning layer, a nonmagnetic insertion layer, and a pinned layer, the nonmagnetic insertion layer located between the pinned layer and the pinning layer, wherein a top surface of the nonmagnetic insertion layer is substantially coplanar with a top surface of the pinning layer, and wherein the nonmagnetic insertion layer adjoins the pinned layer and the pinning layer;
    wherein the element further comprises a nonmagnetic layer and a reference layer, the nonmagnetic layer residing between the reference layer and the pinned layer, the reference layer having a reference layer magnetic moment, the pinned layer having a pinned layer magnetic moment, the reference layer magnetic moment being antiferromagnetically coupled with the pinned layer magnetic moment.

14. A disk drive comprising:
    at least one disk;
    at least one slider including at least one magnetic transducer comprising a bottom shield, a top shield, and an element between the bottom shield and the top shield, the element comprising an antiferromagnetic (AFM) layer, a nonmagnetic insertion layer, a pinned layer, a nonmagnetic layer, and a free layer, the nonmagnetic layer being between the pinned layer and the free layer, the nonmagnetic insertion layer having a location selected from a first location between the pinned layer and the pinning layer and a second location within the pinning layer, wherein the nonmagnetic insertion layer is a discontinuous layer.

15. The disk drive of claim 14 wherein the nonmagnetic insertion layer excludes Mg and Al.

16. A method for providing a magnetic apparatus comprising:
    providing an element, wherein providing the element further comprises:
    providing a pinning layer;
    providing a nonmagnetic insertion layer; and
    providing a pinned layer on the nonmagnetic insertion layer, wherein the nonmagnetic insertion layer is located between the pinned layer and the pinning layer such that a top surface of the nonmagnetic insertion layer is substantially coplanar with a top surface of the pinning layer and, wherein the nonmagnetic insertion layer adjoins the pinned layer and the pinning layer, the pinning layer being an antiferromagnetic (AFM) layer.

17. The method of claim 16 wherein the step of providing the element further comprises:
    providing a nonmagnetic spacer layer; and
    providing a free layer, the nonmagnetic spacer layer residing between the free layer and the pinned layer, the pinned layer being between the free layer and the pinning layer such that the free layer, the nonmagnetic spacer layer, the pinned layer and the pinning layer form a stack.

18. The method of claim 16 wherein the nonmagnetic insertion layer comprises at least one of Ag, Mg, Mn, Ir, Pt, Cr, Ti, Si, C, Al, Ru and Au.

19. The method of claim 16 wherein the nonmagnetic insertion layer has a thickness of at least one Angstrom.

20. The method of claim 16 wherein the step of providing the nonmagnetic insertion layer comprises:
depositing the nonmagnetic insertion layer on a heated substrate.

21. The method of claim 16 wherein the step of providing the nonmagnetic insertion layer comprises:
depositing the nonmagnetic insertion layer on a cooled substrate.

22. The method of claim 16 wherein the step of providing the pinning layer comprises:
depositing the pinning layer on a heated substrate.

23. The method of claim 16 wherein the step of providing the nonmagnetic insertion layer comprises:
depositing the nonmagnetic insertion layer directly on the pinning layer; and
wherein providing the pinned layer further comprises depositing the pinned layer directly on the nonmagnetic insertion layer.

24. The method of claim 16 wherein the nonmagnetic insertion layer is configured such that a ratio of an exchange field to a coercivity for the pinned layer has a maximum at a nonzero thickness of the nonmagnetic insertion layer.

25. The method of claim 16 wherein the nonmagnetic insertion layer excludes Mg and Al.

26. A magnetic apparatus comprising:
an element comprising a pinning layer, a nonmagnetic insertion layer, and a pinned layer, wherein the nonmagnetic insertion layer is located within the pinning layer.

27. A disk drive comprising:
at least one disk;
at least one slider comprising at least one magnetic transducer comprising a bottom shield, a top shield, and an element between the bottom shield and the top shield, the element comprising an antiferromagnetic (AFM) layer, a nonmagnetic insertion layer, a pinned layer, a nonmagnetic layer, and a free layer, the nonmagnetic insertion layer having a location within the pinning layer.

28. A method for providing a magnetic apparatus comprising:
providing an element, wherein providing the element further comprises:
providing a pinning layer;
providing a nonmagnetic insertion layer within the pinning layer; and
providing a pinned layer on the pinning layer.

* * * * *